United States Patent [19]

Short et al.

[11] 4,023,591

[45] May 17, 1977

[54] VALVE OF PARTICULATED MATERIAL FOR VERTICAL FORCED AIR CHANNEL

[76] Inventors: Don L. Short; Steven L. Short, both of 312 S. Columbia Center Blvd., Kennewick, Wash. 99336

[22] Filed: Nov. 14, 1975

[21] Appl. No.: 631,867

[52] U.S. Cl. .............................. 137/533; 137/511; 137/512.1
[51] Int. Cl.² ......................................... F16K 15/00
[58] Field of Search ............... 137/511, 512.1, 493, 137/599, 533

[56] References Cited

UNITED STATES PATENTS

| | | | |
|---|---|---|---|
| 536,245 | 3/1895 | Webster | 137/512.1 |
| 1,613,145 | 1/1927 | Trump | 137/512.1 |
| 2,090,727 | 8/1937 | Gosmann | 137/599 UX |
| 3,320,971 | 5/1967 | Hemenway | 137/512.1 |

*Primary Examiner*—Robert G. Nilson

[57] ABSTRACT

A one way insulating valving structure for a vertical channel having upwardly moving forced air providing a mass of particulated low density material such as plastic carried in a permeable enclosure and movable from a gravity biased lower sealing position to an upward open position by forced air passing therethrough.

6 Claims, 4 Drawing Figures

U.S. Patent    May 17, 1977    4,023,591
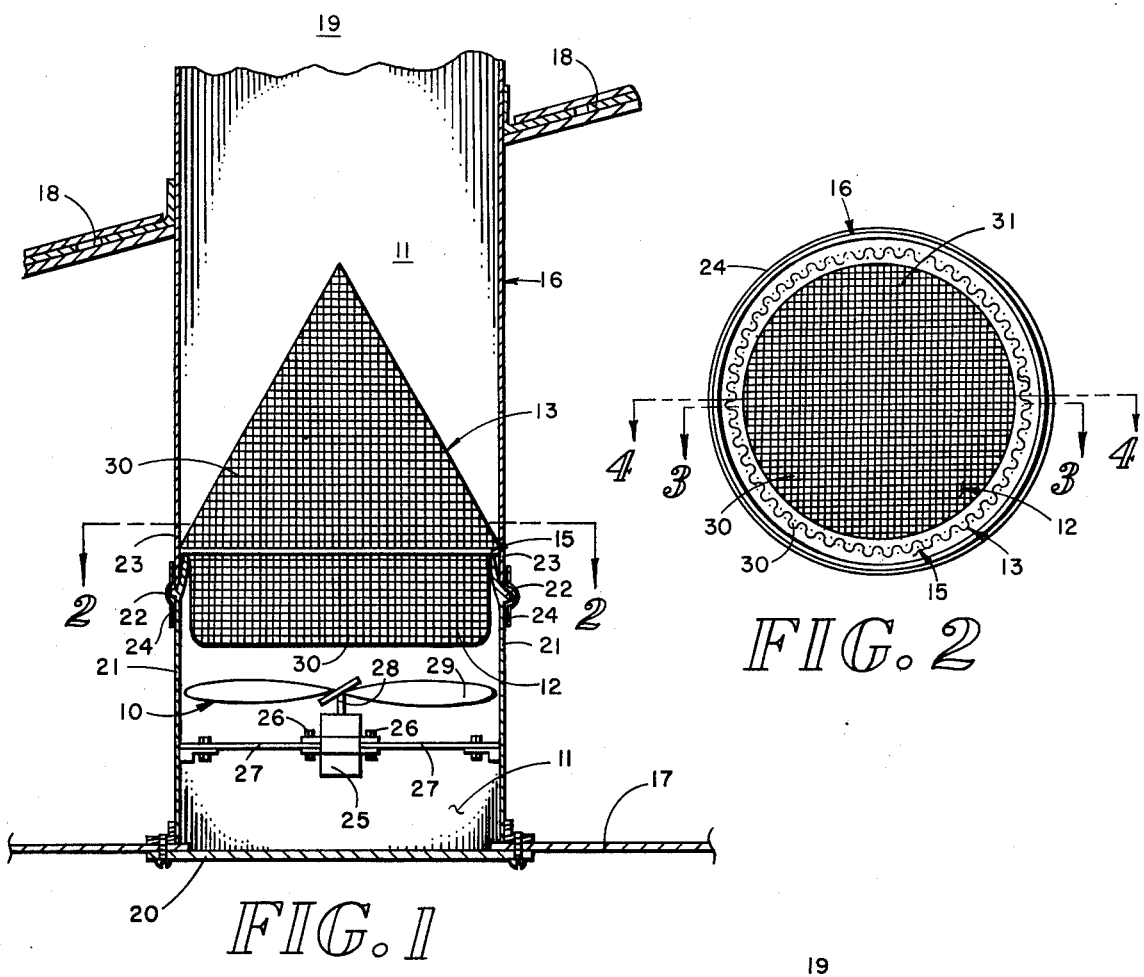
FIG. 1
FIG. 2
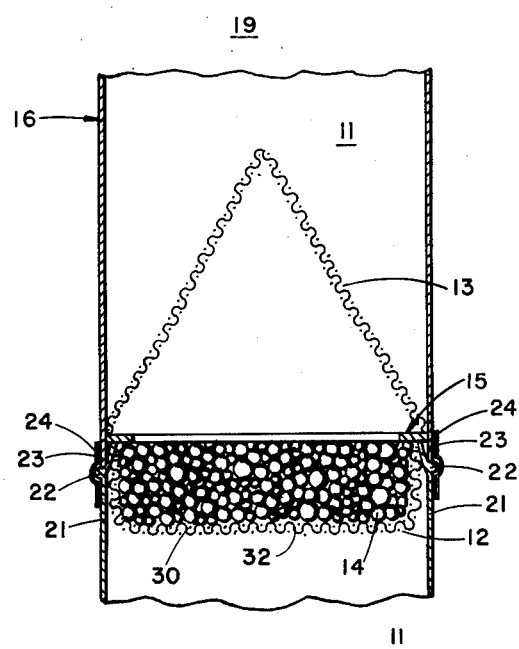
FIG. 3
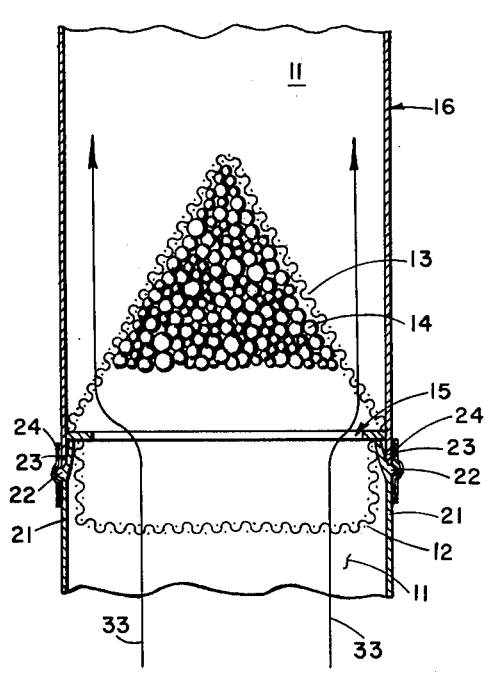
FIG. 4

VALVE OF PARTICULATED MATERIAL FOR VERTICAL FORCED AIR CHANNEL

BACKGROUND OF INVENTION

I. Related Applications

There are no applications related hereto now filed in this or any foreign country.

II. Field of Invention

This invention relates generally to automatic, flow operated gas valves and more particularly to such valves having a sealing member comprised of an unconsolidated mass of low density particulated material.

DESCRIPTION OF THE PRIOR ART

Exhaust fans, or similar air moving apparatus, must provide some exhaust channel exteriorly of the structure vent to serve their purpose. Since these devices are normally operated only periodically it usually is desirable to provide some sort of valve sealing the venting channel when it is not in use. Since many of these exhaust channels are substantially vertically oriented it becomes especially desirable in such structures to seal the channel to flow when the ambient temperature exteriorly thereof is substantially different than that in the area which the channel exhausts.

Various valving structures have heretofore become known for this purpose. These known structures have generally provided some sort of a rigid, usually planar, valving or closure element of a damper nature. It has also become known in the prior art to provide biased, normally closed valves that are openable automatically in response to pressurized flow of air exhausting from interiorly of the valve.

The prior art valves because of their damper-like nature have generally either been not particularly sensitive to open responsively to air flow or else having been of such a delicate nature that they are not reliable and require extensive maintenance. These valves similarly have generally provided only a relatively thin closure element, commonly metallic type, which has very little insulating value other than to stop convective air currents.

The instant invention seeks to alleviate these problems by providing a valving element of particulated low density material such as polystyrene spheres which operates responsive to air-flow with very near mechanical certainty and requires substantially no maintenance over an extremely long maintenance free life span. The valve similarly provides a high insulation factor for any transmission of radiated or conductive heat as well as convective transmission. The valving structure is such that it may be readily installed in the ordinary venting channels of commerce by use of the normal connecting means commonly employed in conjunction therewith.

SUMMARY OF INVENTION

Our invention provides a container structure or valve body formed of permeable material such as screen with a cylindrical bottom part and a conical upper part of somewhat greater volume. The cylindrical part of the container is of substantially a same cross-sectional size and peripheral shape as the channel to be valved, and carries therein an unconsolidated mass of particulated low density material such as size graduated styrofoam balls. An annular sealing ring about the periphery of the cylindrical part of the body seals the area between the body and the carrying channel and provides means of carrying the structure in that channel.

In operation the valve body is installed with the cylindrical portion nearest the pressuring source or fan. As the fan operates a pressure or air-flow is created in the exhaust channel sufficient to lift the mass of particulated valve material upwardly from out of the cylindrical portion of the container structure into the upper apex portion of the upper conic part, with the lower base portion of the conic being unfilled, so that air may pass freely therethrough. When the airflow ceases the balls return by action of gravity to their null position in the lower cylindrical portion of the container to create a seal preventing air flow inwardly therethrough.

In providing such a device it is:

A principal object of our invention to create a one-way automatic valve for somewhat vertically oriented exhaust channels that is simple and certain of operation.

A further object of our invention to provide such a structure that is extremely reliable and maintenance free.

A still further object of our invention to provide such a structure that not only prevents backflow through the exhaust channel, but also provides a closure of high insulative value.

A still further object of our invention to provide such a device that may be simply and easily installed in common venting channels of present day commerce, by use of present day commercial connecting structures.

A still further object of our invention to provide such a valving structure that is of new and novel design, of rugged and durable nature, of simple and economic manufacture and otherwise well adapted for the uses and purposes for which it is intended.

Other and further objects of our invention will appear from the following specification and accompanying drawings which form a part of this application. In carrying out the objects of our invention, however, it is to be remembered that its accidental features are susceptible of change in design and structural arrangement with only one preferred and practical embodiment being illustrated and specified as required.

BRIEF DESCRIPTION OF DRAWINGS

In the accompanying drawings which form a part of this specification and wherein like numbers of reference refer to similar parts throughout:

FIG. 1 is an orthographic side view of our valving structure (with contained particulated material not shown for clarity) in a cut-away venting channel wth exhaust fan therebelow.

FIG. 2 is a horizontal cross-sectional view of the structure of FIG. 1 taken on the line 2—2 thereon, in the direction indicated by the arrows.

FIGS. 3 and 4 are vertical cross-sectional views of the device of FIG. 1 taken on the line 3—3 and 4—4, respectively, of FIG. 2 in the direction indicated by the arrows on each of these lines, FIG. 3 showing the valving structure in closed position and FIG. 4 showing the same structure in open position.

DESCRIPTION OF THE PREFERRED EMBODIMENT

Referring now to the drawings in greater detail and particularly to that of FIG. 1, it will there by seen exhaust channel 11 carrying exhaust fan 10 and supporting thereabove our invention including the body formed of lower cylindrical element 12 and upper conic element 13 containing particulate sealing mass 14 and positioned in the exhaust channel by fastening-sealing ring 15.

Exhaust channel 11 in the form illustrated comprises a cylindrical channel formed of circular sectional pipe 16 extending from exterior surface 17 of an area to be exhausted through its structural periphery, in this case roof 18, to the area of exhaustion 19, normally the ambient atmosphere. Most commonly with normal household and commercial exhaust fans, pipe 16 is substantially vertically oriented, as illustrated. Again, normally, the lower orifice of the pipe 16 is provided with some sort of permeable grill 20 to allow passage of air but prevent access of unwanted articles. Pipe 16 is normally formed of several interconnectable pieces, usually having slidable pipe joints of the type commonly known in the arts. Such joints provide a lower inwardly projecting male part 21 with an inwardly spaced annular bulbous protuberance 22 to slidably receive female part 23 of an adjacent pipe over the part of the male joint above the protuberance. The exterior surface of the male part necessarily must be slightly smaller than the inner surface of the female part 23 for the joint to be functional. Commonly such joints are sealed to prevent excessive air flow therethrough and give additional structural rigidity by the application of some sort of piping tape 24 over the external joints between the adjoining elements.

Exhaust fan 10 is carried in the lower part of exhaust channel 11, normally in its end part nearest the area to be exhausted. Such fans come in many forms but all essentially provide a motor 25 carried in mounting 26 which is in turn supported in the exhaust channel on mounting brackets 27. The motor is mechanically linked 28 to impellor 29 to impart rotary motion thereto upon motor operation. The impellor is so styled that upon rotation it moves air with some velocity from the area to be exhausted outwardly through exhaust channel 11.

All of these various elements are well known in the prior art and many forms and varieties of the several components are available in present day channels of commerce. Commonly exhaust fan 10 will be carried in the exhaust channel 11 but it need not necessarily be, so long as it acts to cause the exhaustion of air through the exhaust channel. Again, commonly, exhaust channel 11 will be formed of cylindrical pipe substantially vertically oriented, but it generally may be of any desired cross-sectional shape and need be only sufficiently vertically oriented in the area of our valve to allow our invention to function as hereafter specified. Neither the exhaust channel or exhaust fan comprise any part of our invention per se, but are necessary adjuncts thereto.

Our invention proper comprises a permeable body defining an internal chamber, configured with lower cylindrical part 12 and upper conic part 13, carrying unconsolidated mass of particulated sealing matter 14. The permeable container 12, 13 is formed of some material that can contain the particulated sealing mass but yet allow relatively free passage of air therethrough. The container must have sufficient rigidity to maintain its shape to perform its function. These requirements are fulfilled by screen-type material formed of either metallic or plastic material.

Lower cylindrical part 12 of the body is formed as a right circular cylinder, or otherwise as necessary to conform to the internal cross-section defined by exhaust channel 11 and of external size slightly less than the size of the exhaust channel so that the body might fit readily therein. Upper conic part of the body is formed in the instance illustrated as a right circular cone with base equal to the diameter of the lower cylndrical part 12. The geometry of these two elements should be such that the volume of the upper conic part is greater, preferably by about one-third, than the volume of the lower cylindrical part. Similarly the circumferential area of the lower cylinder 12 should be substantially equal to the horizontal cross-sectional area of the base of the conic and also equal to the surface area of the upper conic surface that retains particulated sealing mass when the device be in an open condition.

Both parts 11, 12 of the body of our invention may be formed of screen 30 as illustrated. For convenient and economical manufacture the vertical side wall of the lower cylindrical part may be formed of solid sheet metal with screen only in the bottom part (not shown) to provide an air permeable structure.

Fastening sealing ring 15 provides an annular structure having an external diameter equal to the internal diameter of the pipe 16 forming exhaust channel 11. Its internal diameter is not critical, but generally should be as large as reasonably possible to allow relatively free passage of air through the medial orifices 31 defined therein. This annulus or ring is formed of some solid material to prevent passage of air through exhaust channel 11 exteriorally of body 12, 13 of our invention. It also conveniently serves as a means of fastening the two parts of the body together in a structural relationship. Preferably the gasket is formed of rubber, plastic or some similar material.

The mass of sealing particles 14 in the instance illustrated comprises a plurality of size gradiated, substantially spherical polystyrene balls 32, a common product of present day commerce. The sizing of these balls must be such as to allow the mass formed therefrom to present a substantial barrier to the transfer of air therethrough when the balls be contained in lower cylindrical part 12 of the permeable container. This condition appears bestly accomplished by a mass of balls, the largest of which are reasonably small, in the quarter inch range for normal size exhaust channels of some 3 to 6 inches, and with a size gradiation such that the smaller particles form a relatively impervious matrix about the larger particles to create a minimum of non-occupied space in the consolidated mass. The size distribution necessary to accomplish such a condition have heretofore been well studied in the field of statistical mechanics and the methods of such selection are well known. Balls 32 must be such density that they will be gravity biased to a null position in the lower cylindrical part 12 of the permeable body, but yet be movable responsively to the force of air presented thereto to an uppermost position in the apex of conic element 13 during periods of air-flow. The particles must have a nature such that electrical forces are not created therein to cause undue repulsion between particles, or they will not function properly in our invention. We have found polystyrene balls of commerce to be ideally suited for this purpose though undoubtedly other materials of similar physical properties would also fulfill the purpose. The volume of sealing particles is preferably such as to just fill the lower cylindrical part 12 of the permeable container. A smaller volume of balls will be operative in the invention but it will not provide such a good seal or so great an insulative property.

Having thusly considered the structure of our invention, its operation may now be understood, particularly with its reference to FIGS. 3 and 4 of the accompanying drawings.

These figures show our invention, in a vertical cross-sectional view, in place in exhaust channel 11 vertically above exhaust fan 10 (not shown). In FIG. 3 the valve is in the normally biased or relaxed state with the mass of sealing particles 14 biased by gravity to a lowermost position in the permeable body 12, 13 substantially filling the lower cylindrical part thereof. In this condition the balls are packed to form a substantial barrier to any convection of air downwardly through the exhaust channel past our valve structure. This condition will exist in the valve unless and until an upward current of air is presented thereto.

FIG. 4 shows the state of the valve after impingement of an upward current of air having appropriate motion or pressure. The direction of air-flow is shown in the illustration by arrows 33. In changing from the state of FIG. 3 to that of FIG. 4, an air current impinges upon the downwardly gravity biased mass of sealing particles and causes a lift force thereon, apparently by some combination of direct force reaction and some aerodynamic action combined. In any event the particles are lifted responsive to the air current and after a very short period of time they are concentrated in the apex of upper conic part 13 of the permeable body as illustrated in FIG. 4. The particles will remain in this state responsively to and so long as upward air-flow exists through the valve. Upon removal of the air-flow through the valve gravity again will influence the positioning of the mass of sealing particles and they will move downwardly into the lower cylinder to the position illustrated in FIG. 3. The transition from the sealing position of FIG. 3 to the open position of FIG. 4 is nearly instantaneous, depending numerically, however, on several mechanical parameters such as size and density of particles, and force of the impinging air current.

The degree of seal obtained in the valve when closed depends to a large extent upon the efficiency of packing of sealing particles 14. In this regard it is to be noted that particles are moved in any direction either by air-flow or gravity and both methods of movement tend to cause the balls to pack to substantially their greatest packing efficiency or particle density. Practical tests of the sealing valve indicate an efficiency of at least 99 percent to flowing air currents with the parameters hereinbefore specified. Obviously, the efficiency of the device in any given situation is dependent upon many parameters, but under similar conditions the efficiency of our valve is generally as great or greater than that of common rigid damper-type valves presently used for the same purpose. In addition when the valve is in closed condition there is a substantial mass of polystyrene balls through a section of exhaust channel 11 for an appreciable thickness. Since these balls have a high insulative factor they present a substantial barrier to heat transfer therethrough by radiation or conduction which is not presented by the thin metallic damper-like valves.

It should be noted that our invention may be readily installed in existing sections of exhaust channel pipe as illustrated, or it may be readily provided in a special section of such type easily insertable in the odinary exhaust channel.

It should further be noted that the air-flow resistence through our valves is minimal and normally less than that through damper-like valves, but in any event well below the requirements of normal heating and air conditioning standards.

It is further to be noted that the action of our valve depends only upon physical principles and not the motion of mechanically connected parts so that its action is about as positive as possible to create and almost entirely free of maintenance.

Having thusly described our invention, what we desire to protect by Letters Patent, and:

What we claim is:

1. In a substantially vertically oriented, normally closedly biased, air openable valve, the combination comprising:
    a single permeable structure designated as a body, having a smaller lower part forming a valved channel and a larger upper part of conic-like shape, peripherally defining a single channel therethrough; and
    a unitary, non-singulated mass of sealing particles not greater than the volume of the lower part of the permeable body, said particles having physical properties such as to allow the mass of sealing particles to move into the larger upper part of the body responsive to upward air-flow to allow such air-flow through the body.

2. A normally closed valve, to prevent air-flow and heat transfer through a substantially vertically oriented channel, openable responsive to air-flow upwardly therethrough, comprising, in combination:
    a permeable body having a lower cylindrical part conforming to the shape of the carrying channel and a conic part extending upwardly therefrom; and
    a mass of sealing particles of density and configuration such as to be movable from a gravity biased position in the lower cylindrical part of the permeable body to a position in the apex of the upper conic part responsively to air-flow upwardly through the air channel.

3. The invention of claim 2 further characterized by:
    an annular fastening and sealing ring between the lower cylindrical part and upper conic part of the permeable body providing a means for support of the valve in a channel and providing a seal preventing passage of air in the channel outside the permeable body.

4. The invention of claim 2 further characterized by:
    the vertical peripheral surface area of the lower cylindrical part being substantially equal to its horizontal cross-section; and
    the volume defined by the lower cylindrical part being substantaially one-third less than that of the upper conic part.

5. The invention of claim 2 further characterized by:
    the mass of sealing particles being size gradiated for maximum packing and substantially equal to the volume of the lower cylindrical part of the permeable valve body.

6. The invention of claim 2 further characterized by:
    the sealing particles of claim 1 being formed from polystyrene to substantially spherical shape.

* * * * *